(12) United States Patent
Deive

(10) Patent No.: US 7,509,973 B1
(45) Date of Patent: Mar. 31, 2009

(54) SYSTEM TO PREVENT EXCESS FLUID FLOW WITH A SECONDARY RESETTING SHUT-OFF VALVE ASSEMBLY

(76) Inventor: Manuel Deive, P.O. Box 941751, Miami, FL (US) 33194

( * ) Notice: Subject to any disclaimer, the term of this patent is extended or adjusted under 35 U.S.C. 154(b) by 396 days.

(21) Appl. No.: 11/398,206

(22) Filed: Apr. 5, 2006

(51) Int. Cl.
*E03D 11/02* (2006.01)

(52) U.S. Cl. .................. 137/389; 137/400; 137/456; 137/624.27; 4/427; 251/74

(58) Field of Classification Search ............. 137/389, 137/400, 456, 460, 624.27; 251/74; 4/427
See application file for complete search history.

(56) References Cited

U.S. PATENT DOCUMENTS

| | | |
|---|---|---|
| 3,902,201 A | 9/1975 | Bobo |
| 4,017,914 A | 4/1977 | Young, Sr. |
| 4,662,602 A | 5/1987 | Johnson |
| 5,125,120 A | 6/1992 | Baron |
| 5,134,729 A | 8/1992 | Shaw |
| 5,806,556 A | 9/1998 | Johnson |
| 5,971,011 A * | 10/1999 | Price .................. 137/460 |
| 6,041,809 A | 3/2000 | Johnson |
| 6,119,720 A * | 9/2000 | Isaacson et al. .......... 137/459 |
| 6,385,788 B1 * | 5/2002 | Wasielewski ............. 4/415 |
| 6,877,170 B1 * | 4/2005 | Quintana et al. ........... 4/427 |
| 6,896,237 B2 | 5/2005 | Beh et al. |

* cited by examiner

*Primary Examiner*—John Rivell
*Assistant Examiner*—Craig M Schneider
(74) *Attorney, Agent, or Firm*—Albert Bordas, P.A.

(57) ABSTRACT

A system to prevent an excess flow of water to a toilet tank in the event of a failure of a primary flow control assembly including a novel secondary shut-off valve which is automatically disposed into an initialized configuration upon completion of a normal flush cycle, but which is disposed into a closed configuration in the event of a failed flush cycle.

7 Claims, 5 Drawing Sheets

⬅······  FREE-FLOW WATER PATH

⬅─·─·─  WATER FLOW PATH IN CONDUIT

SYSTEM TO PREVENT EXCESS FLUID FLOW WITH A SECONDARY RESETTING SHUT-OFF VALVE ASSEMBLY

BACKGROUND OF THE INVENTION

1. Field of the Invention

The present invention is directed to a system to prevent continuous excess fluid flow, such as a flow of water to a toilet tank following a flush cycle, which utilizes a secondary resetting shut-off valve assembly. More in particular, the present system incorporates a novel valve mechanism which automatically resets itself upon completion of a normal flow cycle, such as a flush cycle, in preparation for a subsequent cycle, but which will positively shut-off fluid flow in the event that a primary flow control assembly of the toilet fails.

2. Description of the Related Art

Although a majority of the Earth's surface is covered by water, sources of fresh water for drinking, cooking, bathing, etc., have long been known to be limited. As such, conservation of water, mainly in the form of minimizing or eliminating excess usage and/or waste of our water resources continue to be part of our daily lives. For example, water saving shower heads which limit the gallons per minute discharged, regardless of how much a user may open the hot and/or cold water valves are often mandated for new construction. Additionally, low flow toilet structures which limit the volume of water per flush are more and more common and are also mandated in certain instances. In the extreme, water bans are more frequently instituted which limit activities such as washing a car or watering a lawn.

A common and persistent source of water waste is present in almost every home and business in the country, and in fact, around the world. Specifically, failure of a standard toilet flow control assembly for a toilet tank is a common and recurring source of water waste. This is due in part to the fact that there are several common failure points within most standard toilet flow control assemblies. First, it is almost inevitable that at some point, the flapper valve of a standard toilet flow control assembly will not properly reseat, in which case, water will continue to steadily drain into the toilet bowl, and the toilet tank will be continuously refilled until the flapper valve is again properly reseated, either during a subsequent flush cycle, or it is otherwise repaired or replaced.

Another common problem with standard flow control assemblies is a float system utilized to stop flow through a primary shut off valve in the toilet tank. More in particular, a primary shut-off valve typically relies upon a mechanical linkage to a float member within the toilet tank, such that the primary valve is closed and flow is discontinued, once the float reaches a preset level within the toilet tank. However, it is not uncommon for either the float member to stick or otherwise become hung up in the toilet tank, thereby preventing the linkage from acting upon the primary shutoff valve, as is required to positively stop flow. Another common pitfall in such standard flow control assemblies is the failure or partial failure of the seat of the primary shut-off valve such that even when the float member attains the preset level and the linkage acts upon the valve as necessary, a certain amount of flow continues to enter the toilet tank which then flows into the toilet bowl and out through the drain.

While many people are aware of the foregoing problems which result in water being wasted because of a defective toilet flow control assembly, many do not realize that these seemingly small leaks can result in hundreds if not thousands of gallons of water wasted over even a short period of time.

To address this problem, a number of devices have been developed to alleviate the problem of water being wasted due to a standard toilet flow control assembly. One such device replaces part of a standard toilet flow control assembly, i.e., a float and shut-off valve, with a valve means having a water flow inlet and a water flow outlet which is divided into divergent streams. One stream is simply directed into the tank to fill the same, while the other stream is directed towards a turbine means. This device further comprises an actuation means structured to open an inlet valve means and initiate flow, and an operation means cooperating with the turbine means to hold the inlet valve open and permitting flow only until the turbine means rotates through a predetermined number of revolutions, at which point the inlet valve means is closed and flow into the tank is terminated.

Several similar devices have been described which utilize a turbine or water wheel to provide a measure of flow into a toilet tank which comprise a housing for the wheel through which the entire inlet flow of water must pass through, rather than the divergent flow streams of the aforementioned device. As with the aforementioned device, these similar devices require an actuation mechanism to initiate the flow of water into the tank.

Although each of these devices eliminate the aforementioned problem with regard to the float being hung up and/or the linkage failing to completely reseat the shut-off valve, none of these devices provide any means to prevent the flow of water in the event the inlet valve fails to close completely. Thus, if any of these devices fails to completely close the inlet valve, for example, in the event of failure of the valve seat, water will continue to flow into the tank, and then into the toilet bowl, and out to the drain, thus continuing to permit water to be wasted.

Thus, it would be beneficial to provide a means to assure that water does not continue to flow to a toilet tank in the event of any failure of a primary flow control assembly, whether it be caused by a float, a shut-off valve, a flapper valve, or any combination thereof. It would also be helpful to provide a mechanism which a user must manually reset after a failed flush cycle, thereby alerting the user of a flush cycle failure. Also, it would be desirable to provide such a mechanism which may be readily installed in-line to an existing water supply line to a toilet. An additional benefit may be realized by providing such a mechanism which does not require actuation after installation during normal operation of the primary flow control assembly.

SUMMARY OF THE INVENTION

As indicated above, the present invention is directed to a system for preventing excess water flow, for example, the flow of water to a toilet having a toilet tank and a toilet bowl, a urinal, or similar plumbing structure. Most, if not all, toilets include a primary flow control assembly installed in the toilet tank which is disposed in fluid communication with a water supply and is structured to regulate a fluid flow into a toilet tank. Such a primary flow control assembly typically includes a valve, such as a flapper valve, which is structured to seat in an opening in the bottom of the toilet tank to permit selective discharge of its contents into the toilet bowl, by providing a means to displace the flapper valve from the seat, e.g., a flush handle or button. In addition, a standard primary flow control assembly usually includes a float assembly which is interconnected to a primary shut-off valve within the toilet tank, such as, via a mechanical linkage. More in particular, the float is structured to rise with the fluid in the toilet tank as the tank is filled, until a preset liquid level in the tank is attained, at which point the mechanical linkage is structured to act upon the primary shut-off valve such that the valve is closed and further flow into the toilet tank from the water supply is discontinued.

Upon actuation of the flush handle, button, lever, or other device to initiate a flush cycle, the flapper valve is displaced from its seat, as noted above, thereby permitting the discharge of the water from the toilet tank into the toilet bowl, causing the contents of the bowl to flush out through a drain, and refilling the bowl with the water or other fluid, such as the case may be, from the toilet tank. The discharge of water from the tank also results in a lowering of the float, thereby releasing the primary shut-off valve and permitting it to open so that water flows into the toilet tank from the water supply. Upon completion of a normal flush cycle, the flapper valve will reseat itself, typically by gravity, and the float will rise as the toilet tank is refilled until the preset liquid level in the tank is attained and the primary shut-off valve is, once again, closed. As used herein, a normal flush cycle shall mean the process of initiating the flow of fluid, such as from a toilet tank, into a receptacle, such as a toilet bowl, refilling the tank or other container with fluid, reseating a valve between the toilet tank and toilet bowl, and terminating fluid flow to the tank upon reaching a set liquid level in the tank.

It is well known, however, that many factors can prevent a normal flush cycle from occurring, resulting in at least some excess flow of water into the toilet tank, which then flows into the toilet bowl and out through the drain. One common example is the flapper valve being obstructed or hung up in a partially open position, or otherwise failing to properly reseat itself, thereby permitting a continuous flow of water to drain from the toilet tank into the toilet bowl, resulting in the float and the primary shutoff valve continuously cycling to replenish the liquid level in the tank. Another, similar example of wastage occurs when the primary shut-off valve fails to properly reseat thereby allowing water to continuously flow into the toilet tank and out through an overflow pipe into the toilet bowl and, once again, out through the drain. Yet another common reason for failure of a normal flush cycle is due to the float getting stuck in a position below the preset liquid level such that the float fails to act to close the primary shut-off valve and, as in the previous example, water will continue to flow into the tank, overflow into the toilet bowl, and discharge needlessly out through the drain.

In view of the foregoing, the present invention employs a secondary resetting shut-off valve assembly disposed in fluid communication between a water supply and a primary flow control assembly. The secondary resetting shut-off valve assembly, in one embodiment, comprises a housing having an inlet and an outlet, and a valve mechanism disposed in a fluid communicating relation between the inlet and outlet. The valve mechanism includes a valve body having a valve inlet and a valve outlet and, in at least one embodiment, a valve plunger being at least partially disposed through the valve body. More in particular, the valve plunger has a proximal end including at least one valve seat mounted thereon, the valve seat disposed in the valve body and structured to selectively and alternatively permit or prevent fluid communication between the valve inlet and the valve outlet, thereby permitting or preventing flow of fluid therethrough. The valve plunger also includes a distal end which may define a tip. In at least one embodiment, the valve mechanism further comprises a valve biasing element structured to apply a force to the valve plunger in a direction toward the tip of the valve plunger, as explained below.

The secondary resetting shut-off valve assembly of the present invention may comprise a flow detection mechanism having a detection member structured to detect a flow of fluid through the housing, and a flow measurement mechanism structured to measure a predetermined amount of fluid flow through the housing. In at least one embodiment, the flow measurement mechanism includes a measurement member which is disposed in an operative engagement with the valve mechanism and is structured to move in response to the flow of fluid through the housing. Further, the measurement member comprises a receiver mounted thereon which is structured to move with the measurement member during fluid flow through the housing.

In at least one embodiment, the secondary resetting shut-off valve assembly of the present invention includes an engagement mechanism structured to operatively interconnect the flow detection mechanism to the flow measurement mechanism while there is fluid flowing through the housing. Specifically, in this embodiment, the engagement member acts to cause movement of the measurement member in response to a flow of fluid detected by the flow detection mechanism, wherein a specific amount of movement of the measurement member from an initial orientation is determinative of a predetermined amount of fluid flow through the housing.

More importantly, once the predetermined amount of fluid flow through the housing has been measured, the valve mechanism is structured to be disposed into a closed configuration to prevent further fluid flow through the housing. The closure of the valve mechanism is affected, in at least one embodiment, via the valve plunger being disposed into an extended orientation by the valve biasing element into a locking engagement with the receiver on the measurement member. In the extended orientation, the valve seat or seat are repositioned in the valve body so as to prevent flow therethrough. More in particular, as noted above, the measurement member moves during fluid flow through the housing and, as such, the receiver mounted thereon moves as well, and after the predetermined amount of fluid flow through the housing is measured, the measurement member and the receiver will move from an initial orientation to a position wherein the receiver is disposed in an aligned orientation with the tip of the valve plunger. Further, in this embodiment, the tip is retained in the locking engagement with the receiver, and the valve mechanism is maintained in the closed configuration until the valve mechanism is manually reset by a user into an initial configuration. Resetting the valve mechanism, in at least one embodiment, is accomplished by pulling on the proximal end of the valve plunger such that the tip is displaced from the receiver, and a reset biasing element acts upon a reset member interconnected to the measurement member, thereby returning the measurement member, and the receiver, to their initial orientation.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

The system of the present invention is structured to prevent excess fluid flow following a normal cycle of fluid flow, and has been described above in terms of a normal flush cycle in a standard toilet having a primary flow control assembly installed within a toilet tank. It is understood to be within the scope and intent of the present invention to be incorporated into other systems employing some form of primary flow control assembly for a fluid which is subject to failure and which could, therefore, benefit from the incorporation of a secondary resetting shut-off valve assembly as disclosed herein and is generally as shown at 10 throughout the figures.

As just one example, the secondary resetting shut-off valve assembly of the present invention may also be utilized in commercial plumbing applications which do not include a toilet tank or other fluid storage mechanism and rather, rely upon a direct connection to a pressurized fluid supply. In such a system, the primary flow control assembly comprises a flush handle, button, or other mechanism that is structured to permit flow for a fixed period of time, and then close. A secondary resetting shut-off valve 10 in accordance with the present invention may be installed in such a system to prevent excess flow in the event the flush handle sticks or the primary shut-off valve fails to seat completely, thereby preventing excess and unnecessary flow into and through the plumbing structure. Similar applications include automatic faucets which are becoming more and more popular in public facilities, and essentially any fluid flow device having a primary flow control assembly subject to failure.

Figure 1:
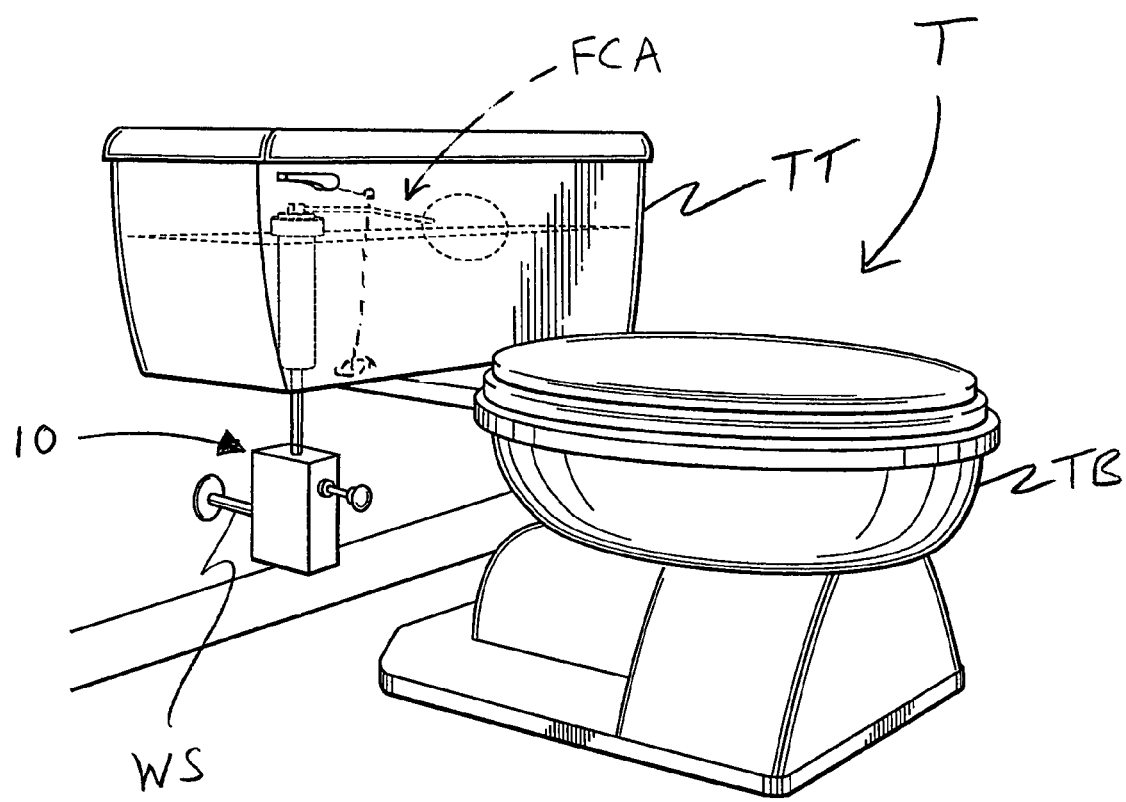
FIG. 1 is a perspective view of the system of the present invention.

FIG. 1 shows one illustrative embodiment of the system of the present invention incorporated in a system with a standard toilet. In particular, toilet "T" includes a toilet bowl "TB" which is disposed in a fluid cooperating arrangement with a toilet tank "TT" such that fluid may flow from the toilet tank "TT" into the toilet bowl "TB" via gravity, thereby displacing the contents of the toilet bowl out through a drain (not shown). The fluid in "the toilet tank "TT" may comprise water direct from a water supply "WS", such as a standard pressurized water line present in a home, office, or similar structure. Alternatively, the toilet tank "TT" may provide means for the addition of treatment chemicals such as disinfectants, deodorants, etc., to the tap water prior to discharge to the toilet bowl "TB".

Additionally, FIG. 1 shows a secondary resetting shut-off valve assembly 10 installed inline between the water supply "WS" and a primary flow control assembly "FCA" as shown in the toilet tank "TT" in phantom lines. As illustrated in FIG. 1, the primary flow control assembly "FCA" comprises a primary shut off valve having a float assembly operatively interconnected thereto, and a flapper valve interconnected to a flush handle to permit selective discharge of the contents of the toilet tank "TT" to the toilet bowl "TB" upon initiation of a normal flush cycle. As illustrated in Figure, it will be appreciated that the primary flow control assembly "FCA" is subject to the myriad of potential failure or partial failure scenarios as described in detail above.

Figure 2:
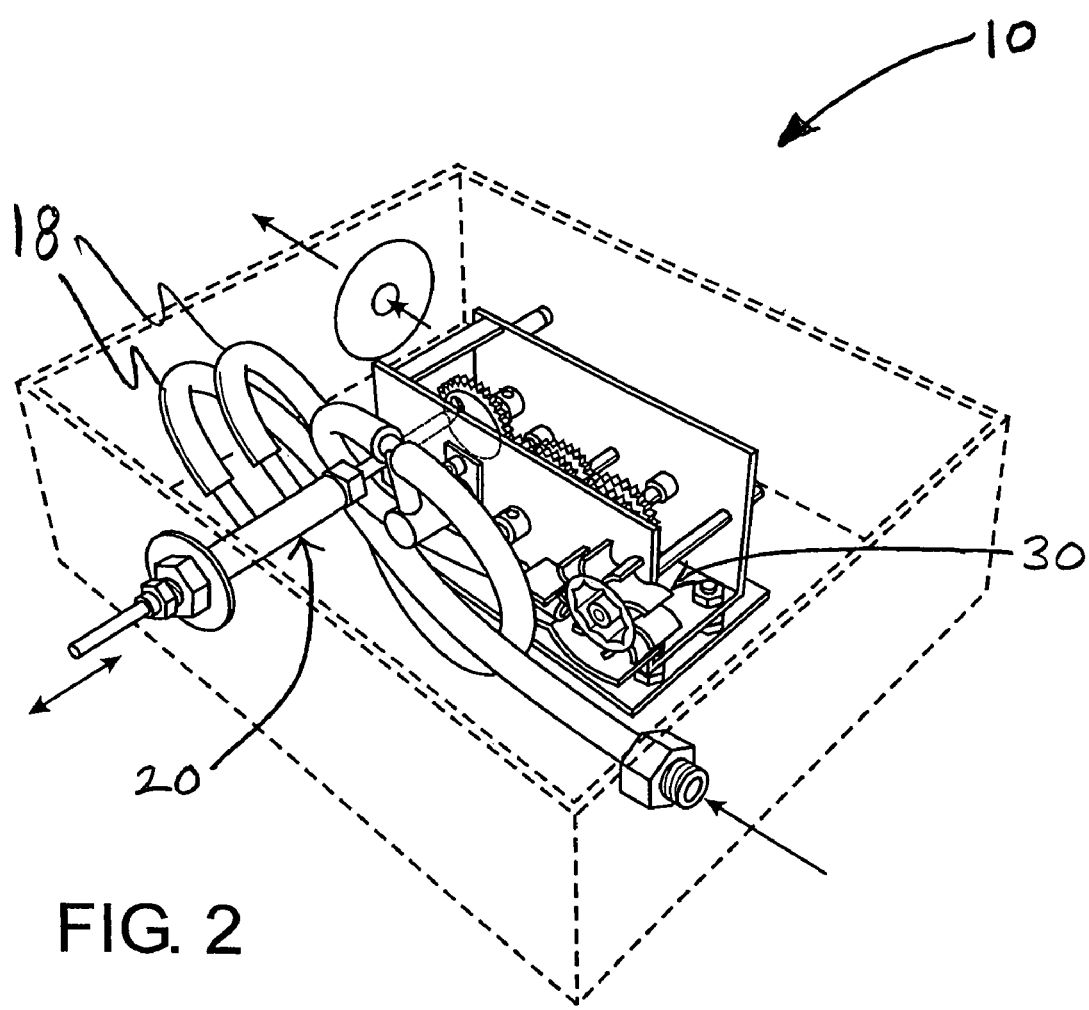
FIG. 2 is a perspective view of the inside of one preferred embodiment of a secondary resetting shut-off valve in accordance with the present invention.

Looking next to FIG. 2, one preferred embodiment of a secondary resetting shut-off valve assembly 10 is shown in perspective. The secondary resetting shut-off valve assembly 10 comprises a housing 12, shown in phantom line in FIG. 2 for purposes of illustration, which includes at least one inlet 14 and at least one outlet 16. The inlet is structured to be interconnected in a fluid tight arrangement with a water or other fluid supply or source, and the outlet 16 is similarly structured to be interconnected in a fluid tight arrangement with an inlet of a toilet tank, or similar fluid utilizing structure as described above. In at least one embodiment of the system of the present invention, the inlet 14 and outlet 16 of the secondary resetting shut valve assembly 10 are structured to be interconnected in fluid communication between a water supply "WS" and a primary flow control assembly "FCA" in a toilet tank "TT" as illustrated in FIG. 1.

Figure 3:
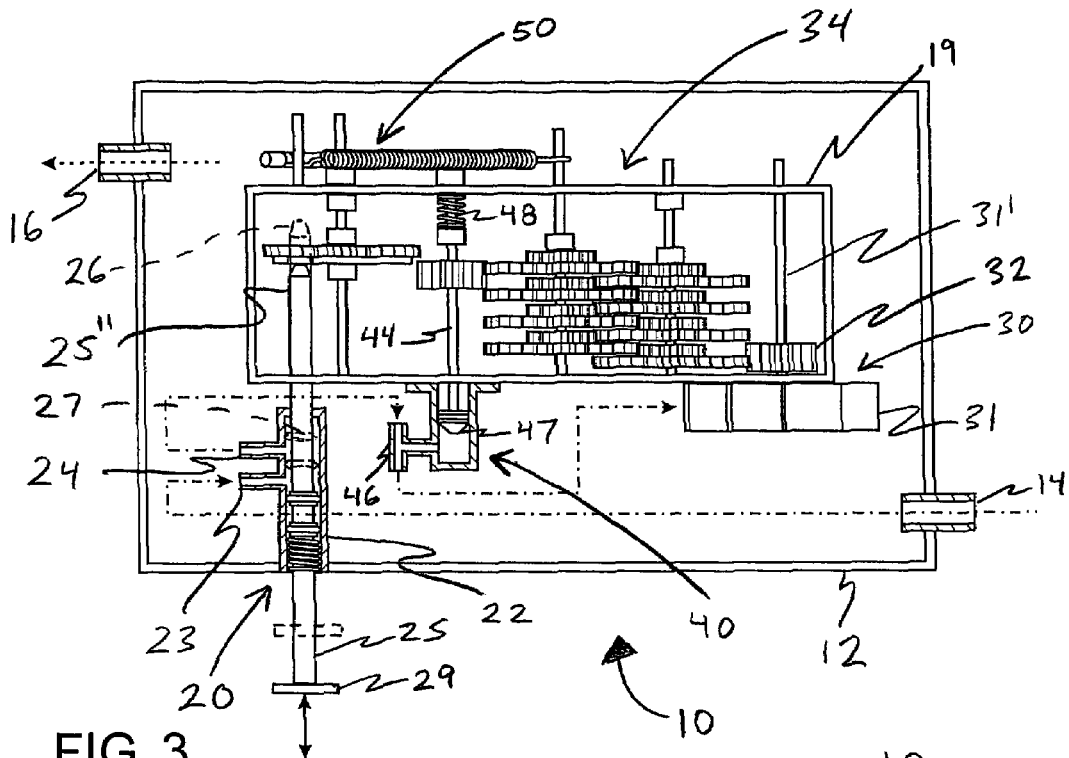
FIG. 3 is a plan view of the secondary resetting shut-off valve of FIG. 2 illustrating an engagement mechanism in a disengaged configuration.

Also, as further illustrated in FIG. 2, the secondary resetting shut-off valve assembly 10 comprises a valve mechanism generally as shown at 20. The valve mechanism 20 includes a valve body 22 comprising a valve inlet 23 and a valve outlet 24, as best illustrated in FIG. 3. In addition, the valve mechanism 20 further comprises a valve plunger 25 having an elongated configuration with a proximal end 25' and a distal end 25" at least partially defining a tip 26. At least a portion of the proximal end 25' of the valve plunger 25 is disposed through a portion of the valve body 22, as illustrated in the figures. More in particular, the valve mechanism 20 comprises at least one valve seat 27 mounted to a portion of the proximal end 25' of the valve plunger 25, specifically, the portion of the proximal end 25' disposed through the valve body 22. The valve plunger 25 is positionable relative to the valve body 22 in the direction of the double headed arrow in FIGS. 3 and 3A. As such, the valve seat 27 is positionable within the valve body 22, and more importantly, the valve seat 27 is positionable between the valve inlet 23 and the valve outlet 24 to at least partially define an open configuration and a closed configuration of the valve mechanism 20.

Figure 3A:
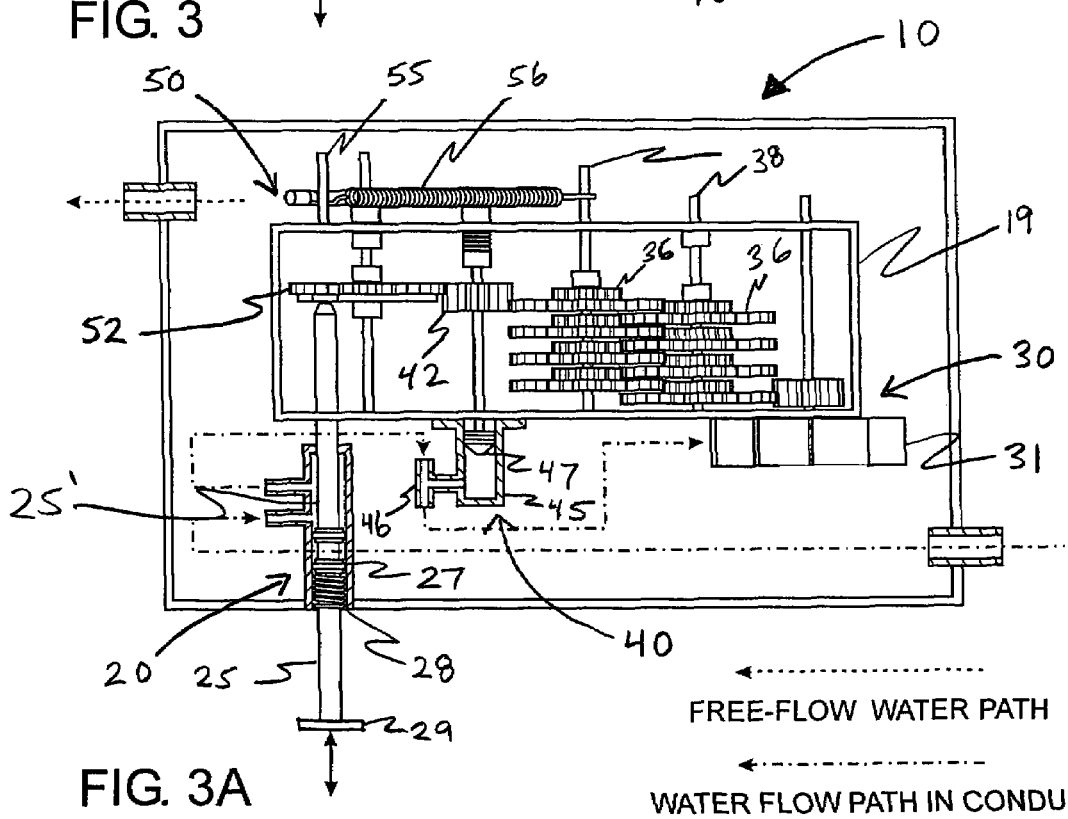
FIG. 3A is a plan view of the embodiment of FIG. 2 illustrating an engagement mechanism in an engaged configuration.

More in particular, and with reference to the illustrative embodiment of FIGS. 3 and 3A, the valve mechanism 20 comprises a plurality of valve seats 27 disposed along a portion of the proximal end 25' of the valve plunger 25 extending through the valve body 22. As shown in FIG. 3A, the valve plunger 25 is disposed in a retracted orientation such that the valve seats 27 are both positioned out of the path of flow between the valve inlet 23 and the valve outlet 24, thereby permitting flow therethrough, and partially defining an open configuration of the valve mechanism 20. Conversely, the valve plunger 25 is disposable into an extended orientation, as illustrated in FIG. 3, wherein tip 26 is disposed into a locking engagement with a portion of a measurement mechanism 50, as discussed in detail below, and at least partially defining a closed configuration of the valve mechanism 20. The closed configuration of the valve mechanism 20 is further defined by the valve seats 27 being disposed in the path of flow between the valve inlet 23 and the valve outlet 24, thereby preventing flow therethrough, as illustrated in FIG. 3.

The illustrative embodiment of FIGS. 3 and 3A further illustrate a valve biasing element 28, structured to engage the valve plunger 25 and to apply a force to the valve plunger 25 in the direction of the tip 26. The valve biasing element 28 is disposed in a primary compressed state when the valve plunger 25 is disposed in a retracted orientation, as in FIG. 3A, and the valve biasing element 28 is disposed in a secondary compressed state when the valve plunger 25 is disposed in an expanded orientation, as illustrated in FIG. 3. Regardless of the configuration of the valve plunger 25, the valve biasing element 28 is structured to apply at least some force to the valve plunger 25 in the direction of the valve tip 26, thereby normally biasing the valve plunger 25 into its extended configuration.

The secondary resetting shut-off valve assembly 10, in at least one embodiment, further comprises a flow detection mechanism 30, structured to detect a flow of a fluid through the housing 12. As illustrated in the embodiment of FIG. 2, the secondary resetting shut off valve assembly 10 comprises a plurality of conduits 18 structured to at least partially define a flow path for water or other fluid through at least a portion of the housing 12. More in particular, and as further illustrated in FIGS. 3 and 3A, at least one of the plurality of conduits 18 defines a flow path from the inlet 14 of the housing 12 to the valve inlet 23. The flow path through the housing 12 is next directed, via conduits 18, from the valve outlet 24 to an inlet port 46 of an engagement mechanism 40, described hereinafter, and from inlet port 46 to a discharge point proximate a portion of the flow detection mechanism 30.

In at least one embodiment, the flow detection mechanism 30 of the present invention comprises a detection member 31 which is structured to move in the presence of fluid flow directed into contact with at least a portion thereof. In the illustrative embodiment of FIGS. 3 and 3A, the detection member 31 comprises a paddle wheel structure having a plurality of paddles, fins, or vanes mounted around a hub attached to a detection member shaft 31'. The detection member shaft 31' is supported via brackets 19 which are secured in housing 12. In one preferred embodiment, the detection member 31 is rotatably supported on the detection member shaft 31' by the brackets 19, and the detection member 31 is structured to rotate thereabout in the presence of a flow of fluid discharging from the conduit 18 at the discharge point proximate the detection member 31, as described above. Also, in this preferred embodiment, the detection mechanism 30 comprises an interconnection member 32 which is also rotatably mounted on the detection member shaft 31' and is structured to rotate thereabout, corresponding to the rotation of the detection member 31.

The secondary resetting shut-off valve assembly 10 of the present invention further comprises a reduction apparatus 34. More in particular, the reduction apparatus 34 is structured to at least partially translate an amount of movement of the detection member 31 to a degree of movement of a measurement member 52, as discussed further below. In the illustrative embodiment of figures, and as best shown in FIGS. 3 and 3A, the reduction apparatus 34 comprises a series of reduction members 36 mounted in a fixed array about a plurality of reduction member shafts 38 which are rotatably supported by brackets 19. As illustrated, the reduction members 36 comprise a series of gear members having interlocking teeth such that movement of one of the reduction members 36 causes the entire array of reduction members 36 to move correspondingly. Also as shown in FIG. 3, the interconnection member 32 of the detection mechanism 30 comprises a geared member having teeth to interconnect or interlock with at least one of the reduction members 36. While the illustrated embodiment of the present invention comprises a series of reduction members 36 or gears, it is understood to be within the scope and intent of the present invention to utilize alternative structures as are known for reducing the translational movement of one structure to another.

Thus, upon flow of a fluid through valve mechanism 20 to a discharge point proximate the detection member 31, the detection member 31 will rotate in response to the fluid flow, thereby causing a corresponding rotation of the interconnection member 32. Subsequently, the series of reduction members 36 will rotate by virtue of the interconnecting relation between the interconnection member 32 and at least one of the reduction members 36.

As further illustrated in the figures, at least one of the 23 reduction members 36 is structured to operatively engage at least a 24 portion of an engagement mechanism 40. In at least one embodiment, 25 the engagement mechanism 40 comprises an engagement member 42 which is rotatably mounted to an engagement member plunger 44. The engagement mechanism 40 further comprises a pressure chamber 45 which is disposed in fluid communication with the inlet port 46 noted above. Additionally, and as shown in the illustrative embodiments of FIGS. 3 and 3A, the engagement mechanism 40 comprises a seat 47 disposed at a proximal end of the engagement member plunger 44 which is disposed in the pressure chamber 45 in fluid communication with the inlet port 46.

Figure 4:
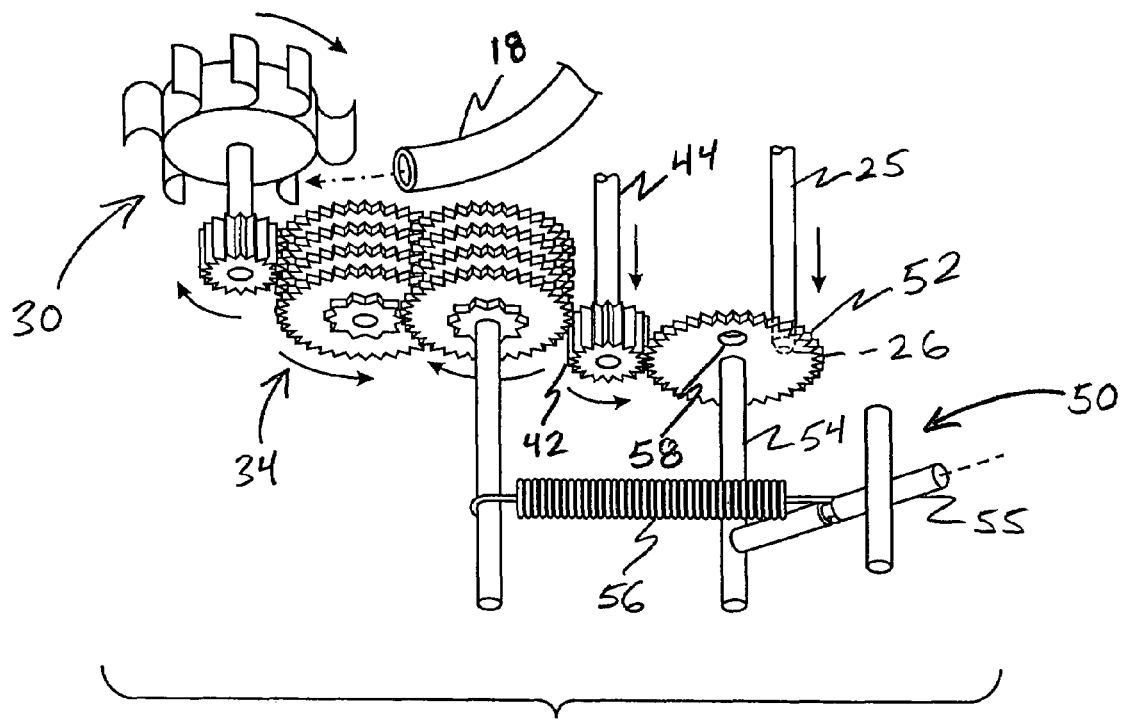
FIG. 4 is a partial perspective view of a secondary resetting shut-off valve in accordance with the present invention upon initiation of a flush cycle.
Figure 5:
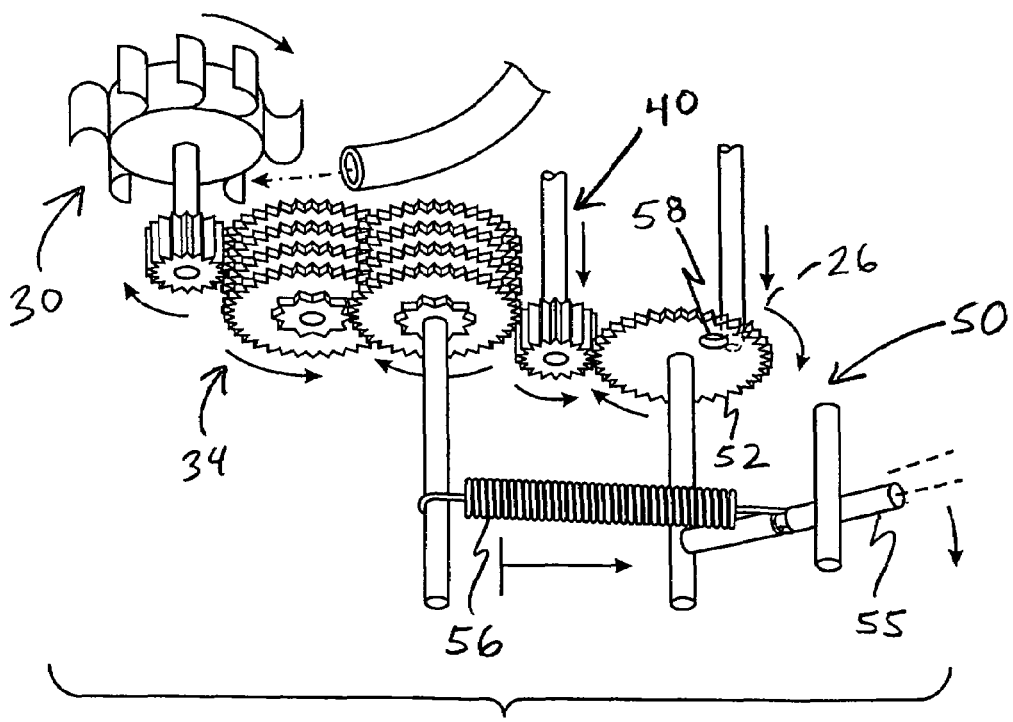
FIG. 5 is a partial perspective view of the embodiment of FIG. 4 near the end of the flush cycle.
Figure 6:
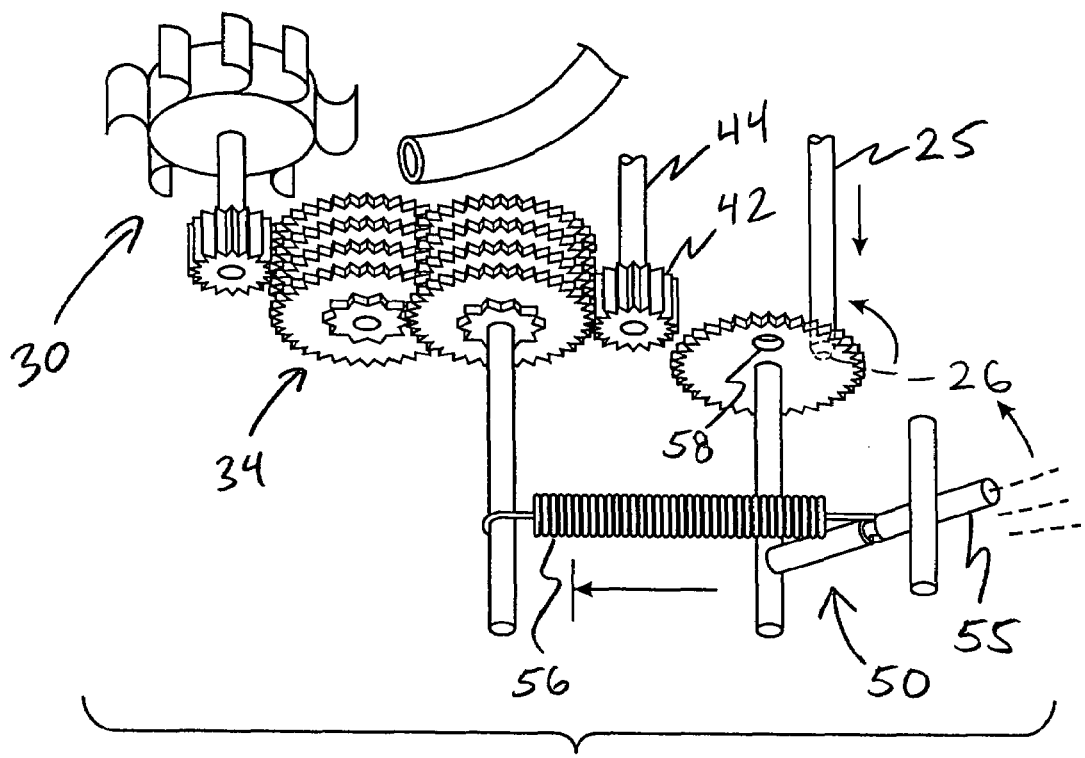
FIG. 6 is a partial perspective view of the embodiment of FIG. 4 in an initial configuration following a normal flush cycle.
Figure 6A:
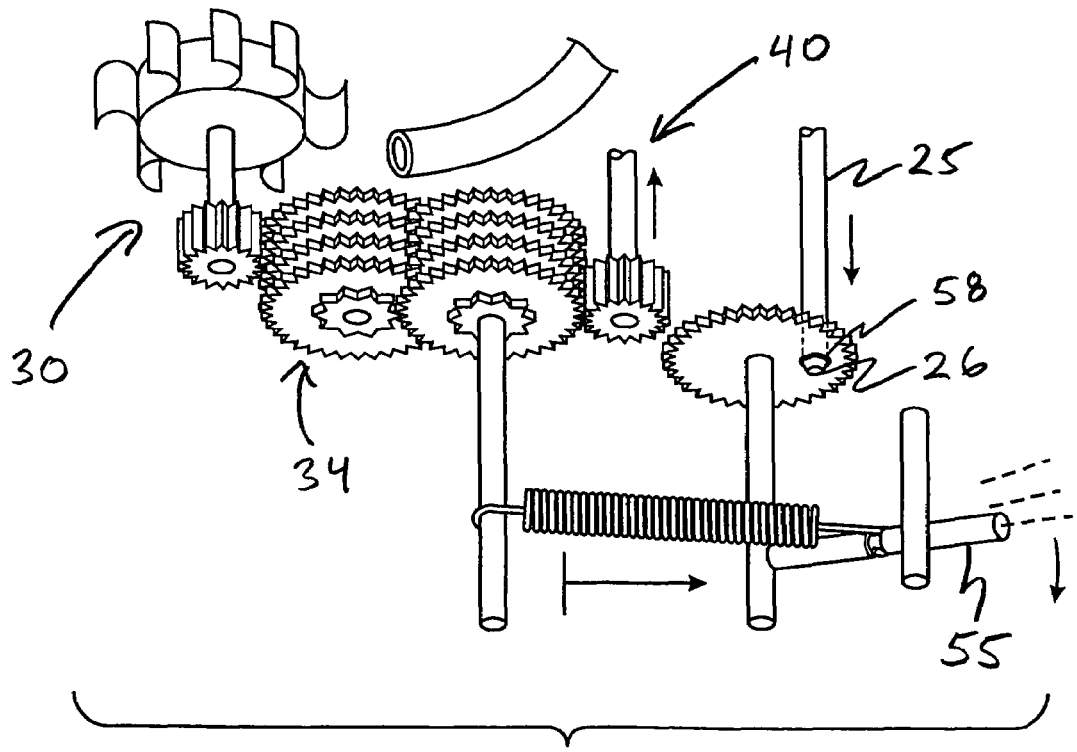
FIG. 6A is a partial perspective view of the embodiment of FIG. 4 in a closed configuration following a failed flush cycle.

The engagement mechanism 40 further comprises an engagement biasing element 48 structured to apply a force to the engagement member plunger 44 in the direction of the seat 47, so as to normally dispose the engagement mechanism 40 into a disengaged configuration while there is no fluid flowing through the housing 12, as illustrated in FIGS. 3 and 6A. Conversely, upon initiation of fluid' flow through the housing 12, the pressure in pressure chamber 45 will approximate the pressure in the conduit 18 which will be essentially equal to the incoming line pressure of the water supply which, in many residential and commercial applications, is typically in the range of about 20 to 60 psi. This incoming line pressure in the pressure chamber 45 acts upon the seat 47 and overcomes the opposing force applied to the engagement member plunger 44 by the engagement biasing element 48, thereby causing the engagement mechanism 40 to move into an engaged configuration, as is illustrated in FIGS. 3A, 4, and 5.

As previously indicated, the secondary resetting shut-off valve assembly 10 of the present invention further comprises a flow measurement mechanism 50. The flow measurement mechanism 50 comprises, in at least one embodiment, a measurement member 52 which is mounted to a measurement member shaft 54 which is also supported in the housing 12 by one or more brackets 19. As shown in the illustrative embodiment of FIG. 3, when the engagement mechanism 40 is disposed in a disengaged configuration, the engagement member 42 only contacts a portion of the reduction apparatus 34, specifically, one of the reduction members 36, and thus, the engagement member 42 is free to rotate with the reduction member 36. However, when the engagement mechanism 40 is disposed into an engaged configuration, as in FIG. 3A, the engagement member 42 is positioned in an interconnecting relation between the reduction apparatus 34 and the flow measurement mechanism 50. More in particular, and as illustrated in FIGS. 3A, 4, and 5, when the engagement mechanism 40 is disposed into the engaged configuration, the engagement member 42 is operatively engaged and interconnected between at least one of the reduction members 36 and the measurement member 52, such that movement of the reduction members 36 of the reduction apparatus 34 will result in a corresponding movement of the measurement member 52, by virtue of the operative engagement of the engagement member 42 therebetween.

As will be further appreciated, since the movement of the reduction members 36 of the reduction apparatus 34 are affected by movement of the detection member 31 of the detection mechanism 30, the measurement member 52 is caused to move in response to a flow of fluid through the housing 12, by virtue of the interconnected relationship between the flow detection mechanism 30, the reduction apparatus 34, the engagement mechanism 40, and the flow measurement mechanism 50. Furthermore, it will be appreciated that through the selection of the fixed array of the reduction members 36 of the reduction apparatus 34, and more specifically, the gear reduction ratio effected therein, in conjunction with the size of the interconnection member 32, the engagement member 42, and the measurement member 52, a predetermined amount of fluid flow through the housing 12 may be measured in terms a corresponding degree of movement of the measurement member 52.

The significance of the foregoing lies in the fact the measurement member 52 includes a receiver 58 mounted thereto which is structured to move in conjunction with the measurement member 52. More specifically, in at least one embodiment, the receiver 58 comprises an aperture through the movement member 52 and is structured to move along a path of rotation from an initial orientation, such as is illustrated in FIG. 6, to an aligned orientation with the tip 26 of the valve plunger 25 of the valve mechanism 20, as illustrated in FIG. 6A.

Looking to FIGS. 4, 5, and 6, a normal flush cycle will be described. To begin, the secondary resetting shut-off valve assembly 10 is disposed in an initial orientation, such as illustrated in FIG. 6. Upon actuation of a flush handle, button, or other actuation device, fluid will begin to flow through the housing 12, as described above, and the pressure of the incoming fluid flow at the inlet port 46 will cause the engagement mechanism to move into an engaged orientation, as illustrated in FIG. 4. Also FIG. 4 shows the valve plunger 25 disposed in a retracted configuration with the tip 26 of the valve plunger 25 disposed in an abutting relation to the measurement member 52, such that the valve mechanism 20 is an open configuration. FIG. 4 further illustrates a reset member 55 interconnected to the measurement member 52, and structured to move therewith. The reset member 55 is mounted to the measurement member shaft 54 and is disposed in an initial orientation, having a reset biasing element 56 interconnected thereto and initially disposed in a relaxed state.

As fluid flows through the housing 12, the interconnecting relationship between the flow detection mechanism 30 and the flow measurement mechanism 50 described above causes the measurement member 52 to move to an intermediate position, for example, as is shown in FIG. 5. More in particular, the measurement member 52 rotates a predetermined degree based upon a specific period of time that fluid is flowing through the housing 12, such that the predetermined amount of fluid flow through the housing is measured. FIG. 5 also illustrates that as the measurement member 52 rotates, the receiver 58 moves along a path of rotation from the initial orientation of FIG. 4, and the reset member 55 is rotated with the measurement member 52 thereby placing the reset biasing element 56 in tension.

Upon completion of a normal flush cycle, or other fluid flow operation, i.e., wherein fluid flow through the housing 12 is terminated as a result of a primary fluid control assembly positively closing and preventing further flow therethrough, the pressure in the housing 12 will equilibrate such that the pressure in the pressure chamber 45 will be essentially equal the pressure in the rest of the housing 12. At that point, the engagement biasing element 48 will force the engagement member 42 of the engagement mechanism 40 into a disengaged configuration, as illustrated in FIG. 6. Subsequently, the tension on the reset biasing element 56 is released and the reset biasing element 56 acts to return the reset member 55 to its initial orientation, as in FIG. 4, thereby returning the measurement member 52 and the receiver 58 to the initial orientation as well. In this manner, the secondary resetting shut-off valve assembly 10 of the present invention is automatically reset to an initialized orientation, and readied for a subsequent flush cycle, or other fluid flow operation.

In the event of any failure or partial failure of the primary flow control assembly to positively terminate flow after a predetermined amount of fluid flow through the housing 12, the measurement member 52 will continue to move or rotate and the receiver 58 will continue to move along the path of rotation until it is disposed in an aligned orientation with the tip 26 of the valve plunger 25, as illustrated in FIG. 6A. At this point, the valve biasing element 28 will act to dispose the valve plunger 25 from the retracted orientation of FIG. 5, to the extended orientation of FIG. 6A, thereby repositioning the valve seat(s) 27 in the valve body 22 so as to prevent the further flow of fluid therethrough, in the manner previously described. Thus, the secondary resetting shut-off valve 10 of the present invention acts to terminate the flow of fluid to a primary flow control assembly after a predetermined amount of flow through the assembly 10, thereby preventing unnecessary flow and the waste associated therewith.

It will be further appreciated from FIG. 6A, that once the tip 26 of the valve plunger 25 is extended into a locked orientation with the receiver 58 of the measurement member 52, the secondary resetting shut-off valve assembly 10 of the present invention prevents any further fluid flow therethrough, until the valve mechanism 20 is manually reset by pulling the valve plunger 25 outwardly from the extended and locked orientation into the retracted orientation, such as by reset handle 29. As such, the secondary resetting shut-off valve assembly 10 of the present invention serves to alert a user of a failure of a normal flush cycle, or other fluid flow operation, such that the appropriate maintenance or repair can be conducted and the waste of water or other fluid eliminated.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A secondary resetting shut-off valve assembly, said assembly comprising:
    a housing having an inlet and an outlet,
    a valve mechanism disposed in a fluid communicating relation with said inlet and said outlet,
    a flow measurement mechanism comprising a measurement member disposed in an operative engagement with said valve mechanism,
    a reduction apparatus to at least partially translate an amount of movement of a detection member, said reduction apparatus comprises a series of reduction members mounted in a fixed array about a plurality of reduction member shafts, said reduction members comprise a series of gear members having interlocking teeth such that movement of one of said reduction members causes an entire array of said reduction members to move correspondingly, said flow measurement mechanism structured to measure a predetermined amount of said fluid flow through said housing, said measurement member disposed in an initial orientation prior to said fluid flow through said housing, said measurement member structured to move from said initial orientation during said fluid flow through said housing, said measurement member structured to move back to said initial orientation when said fluid flow through said housing terminates before said predetermined amount of said fluid flow through said housing is measured, said measurement member is further structured to rotate during said fluid flow through said housing, said measurement member comprises a receiver, said receiver structured to rotate along a path of rotation with said measurement member during said fluid flow through said housing, said valve mechanism structured to be disposed into a closed configuration to prevent said fluid flow through said housing after said predetermined amount of said fluid flow through said housing is measured, and said valve mechanism comprises a valve plunger having a distal end comprising a tip, said tip being normally disposed in an abutting relation to a portion of said measurement member along said path of rotation of said receiver.

2. The assembly as recited in claim 1 wherein said receiver rotates along said path of rotation toward said tip during said fluid flow through said housing.

3. The assembly as recited in claim 2 wherein said receiver rotates along said path of rotation into a locking alignment with said tip after said predetermined amount of fluid flow through said housing is measured.

4. The system as recited in claim 3 wherein said closed configuration is at least partially defined by said tip disposed in a locking engagement with said receiver.

5. The assembly as recited in claim 4 wherein said tip is retained in said locking engagement with said receiver and said valve mechanism is maintained in said closed configuration until said valve mechanism is manually reset.

6. A system for preventing excess water flow, said system comprising:

a toilet having a toilet bowl and a toilet tank, a primary flow control assembly installed in said toilet tank, said primary flow control assembly structured to at least permit a fluid flow into said toilet tank, a secondary resetting shut-off valve assembly disposed in fluid communication between a water supply and said primary flow control assembly, said secondary resetting shut-off valve assembly comprising:

a housing having an inlet and an outlet, a valve mechanism disposed in a fluid communicating relation with said inlet and said outlet, a flow detection mechanism comprising a detection member structured to detect a fluid flow through said housing, a reduction apparatus to at least partially translate an amount of movement of said detection member, said reduction apparatus comprises a series of reduction members mounted in a fixed array about a plurality of reduction member shafts, said reduction members comprise a series of gear members having interlocking teeth such that movement of one of said reduction members causes an entire array of said reduction members to move correspondingly, a flow measurement mechanism comprising a measurement member disposed in an operative engagement with said valve mechanism, said flow measurement mechanism structured to measure a predetermined amount of said fluid flow through said housing, an engagement mechanism structured to operatively interconnect said flow detection mechanism to said flow measurement mechanism during said fluid flow through said housing, said flow measurement mechanism comprising a measurement member having a receiver structured to move during said fluid flow through said housing, said valve mechanism structured to be disposed into a closed configuration to prevent said fluid flow through said housing after said predetermined amount of said fluid flowthrough said housing is measured, said closed configuration is at least partially defined by said tip disposed in a locking engagement with said receiver, and said valve mechanism comprises a valve plunger having a distal end comprising a tip.

7. The system as recited in claim 6 wherein said tip is retained in said locking engagement with said receiver and said valve mechanism is maintained in said closed configuration until said valve mechanism is manually reset into an initial configuration.

* * * * *